(12) United States Patent
Inada et al.

(10) Patent No.: US 11,498,135 B2
(45) Date of Patent: Nov. 15, 2022

(54) GUN DRILL MACHINE

(71) Applicant: HI-TAK CO., LTD., Numazu (JP)

(72) Inventors: Hiroshi Inada, Numazu (JP); Hidenori Inada, Numazu (JP); Masayuki Sato, Numazu (JP)

(73) Assignee: HI-TAK CO., LTD., Numazu (JP)

( * ) Notice: Subject to any disclaimer, the term of this patent is extended or adjusted under 35 U.S.C. 154(b) by 49 days.

(21) Appl. No.: 17/252,063

(22) PCT Filed: Mar. 17, 2020

(86) PCT No.: PCT/JP2020/011777
§ 371 (c)(1),
(2) Date: Dec. 14, 2020

(87) PCT Pub. No.: WO2021/186570
PCT Pub. Date: Sep. 23, 2021

(65) Prior Publication Data
US 2022/0055122 A1 Feb. 24, 2022

(51) Int. Cl.
*B23B 41/02* (2006.01)

(52) U.S. Cl.
CPC .......... *B23B 41/02* (2013.01); *B23B 2270/30* (2013.01)

(58) Field of Classification Search
CPC .................... B23B 41/02; B23B 2270/30
See application file for complete search history.

(56) References Cited

U.S. PATENT DOCUMENTS

| | | | |
|---|---|---|---|
| 3,361,014 A | 1/1968 | McClennan | |
| 4,377,023 A * | 3/1983 | Boesch | B23B 41/02 29/27 R |
| 4,574,439 A * | 3/1986 | Weiblen | B23B 41/02 29/27 R |
| 4,869,627 A | 9/1989 | Weiblen | |
| 5,181,812 A * | 1/1993 | Labinka | B23B 41/02 408/67 |
| 6,947,800 B2 * | 9/2005 | Flanagan | B23Q 17/09 72/20.1 |
| 7,207,751 B2 * | 4/2007 | Feddersen | B23B 41/02 408/67 |
| 8,839,699 B2 * | 9/2014 | Nishitani | B23Q 17/2233 82/1.4 |

FOREIGN PATENT DOCUMENTS

| | | | |
|---|---|---|---|
| DE | 20005442 U1 * | 5/2000 | ............ B23B 41/02 |
| EP | 0 141 152 A2 | 5/1985 | |

(Continued)

OTHER PUBLICATIONS

Jun. 9, 2020 International Search Report issued in International Patent Application No. PCT/JP2020/011777.

*Primary Examiner* — Eric A. Gates
(74) *Attorney, Agent, or Firm* — Oliff PLC

(57) ABSTRACT

A gun drill machine capable of shortening a margin dimension required in a gun drill as much as possible. In a free zone between a chip box and a moving spindle unit, a plurality of swing stopping devices for loosely holding a gun drill and suppressing the swing of the gun drill are arranged, and each swing stopping device is configured to freely retract from a steady action position where a swing stopping action is performed to avoid interference with the spindle unit that moves in the free zone.

6 Claims, 12 Drawing Sheets

(56) References Cited

FOREIGN PATENT DOCUMENTS

| | | | | |
|---|---|---|---|---|
| JP | 62004504 | A | * | 1/1987 |
| JP | 04210312 | A | * | 7/1992 |
| JP | 2000-190152 | A | | 7/2000 |
| JP | 2001-287109 | A | | 10/2001 |
| JP | 2018-062035 | A | | 4/2018 |
| RU | 1818176 | A1 | * | 5/1993 |

* cited by examiner

GUN DRILL MACHINE

TECHNICAL FIELD

The present invention relates to a gun drill machine that performs deep hole processing on a workpiece, and particularly relates to an improvement of a gun drill machine that stabilizes the operation of a gun drill and achieves accurate deep hole processing.

BACKGROUND ART

As is well known, a gun drill machine that performs deep hole processing on a workpiece has an operation principle that a long gun drill with a special cross-sectional shape is rotationally driven and made to act inside the workpiece to perforate, and the processing technology is established if the hole diameter and the processing depth dimension can be corresponded by conventional methods (for example, see patent literature 1). In addition, the deep hole processing usually means forming a hole having a ratio of hole dimension to diameter, i.e. a L/D value of 20 to 200 or more.

On the other hand, when processing requirement specifications are extremely strict, it is required to develop the entire device and accumulate a lot of know-how.

Specifically, as an example of the difficult processing requirement specification, it is assumed that a stainless steel workpiece having a relatively hard material is used, and as for the processing dimension, the diameter is 1 mm or less and the hole length exceeds 200 mm.

In the case of the above specification, obviously, a gun drill which has a perforation diameter of 1 mm is used, and the total length of the gun drill is about 300 mm if a margin part not directly involved in the perforation is included. In addition, the shape of the gun drill is a shape that resembles a circular shape cut by about ¼ circumference, and is not a perfect circular cross-sectional shape. Therefore, it is extremely difficult to rotate the gun drill stably, and it has been considered that accurate processing cannot be performed conventionally.

That is, as shown in FIG. 12(*a*), even if the processed end side of a gun drill 5' with a workpiece W is accurately regulated by a chip box 3', during processing, with the high-speed rotation of the gun drill 5' (for example, rotation of about 12000 rpm), a state of a skipping rope phenomenon or a ballooning phenomenon in which the gun drill 5' bends like a spindle is presented, and obviously, the movement also induces breakage of the gun drill 5'.

Therefore, conventionally, as shown in FIG. 12(*b*), a swing stopping device 6' for stabilizing the gun drill 5' is arranged in a free zone Z between the chip box 3' and a spindle unit 2'. However, as shown in FIG. 12(*c*), a swing stopping bush 63' matches the movement of the spindle unit 2' and is pushed by the movement to move only in an extruded manner sequentially from the base end side. As a result, the positions where the swing stopping of the gun drill 5' is regulated do not become equal positions within the range of the free zone Z.

That is, in the state shown in FIG. 12(*b*), even if the distance between a nut 27' for chuck and the swing stopping bush 63', the distance between the swing stopping bushes 63', and the distance between the swing stopping bush 63' and a gizmo seal 31' are set to the same interval d0, as the spindle unit 2' moves, the distance between the nut 27' and the swing stopping bush 63' on the most base end side decreases, so this distance is different from the interval d0. Specifically, as shown in FIG. 12(*c*), an interval dx on the base end side is shorter than the interval d0.

Therefore, although the swing stopping device 6' is arranged for holding the gun drill 5', a complete swing stopping action cannot be expected.

In view of the above problems, the present applicant has developed a novel gun drill machine that can stabilize the operation of the gun drill and achieve accurate deep hole processing by constantly regulating the swing stopping of the gun drill at equal positions within the free zone range, and has already disclosed the technology as Japanese Patent Laid-Open No. 2018-62035 (patent literature 1).

Although this improvement have made it possible to stably perform precise deep hole processing, the present inventor has searched for room for further improvement beyond the above technological development, and has found as a result that there is room for improvement in that the actual length dimension of the gun drill have to be considerably longer than the effective working length. That is, the length of the gun drill inevitably becomes a dimension including the length that acts on the workpiece, a dimension for passing through the chip box, and a dimension for avoiding interference with the swing stopping device remaining in the free zone till the last, in other words, a dimension with a margin dimension added. Obviously, the setting of the length of the gun drill in this way also leads to the destabilization of the working state of the front end of the gun drill.

CITATION LIST

Patent Literature

Patent Literature 1: Japanese Patent Laid-Open No. 2018-62035

SUMMARY OF INVENTION

Technical Problem

The present invention has been made in consideration of the above background, and addresses the problem of developing a gun drill machine capable of shortening a margin dimension required in a gun drill as much as possible.

Solution to Problem

That is, the gun drill machine includes: a bed; a spindle unit that holds a gun drill and moves in a range from a moving start to a moving end on the bed; a chip box that is arranged on the moving end side of the spindle unit and rotatably supports the gun drill; and a workpiece holder arranged adjacent to the chip box on the opposite side of the spindle unit. The front end of the gun drill held in the spindle unit is brought from the chip box to the workpiece held in the workpiece holder. A deep hole is perforated on the workpiece by the rotation of a spindle in the spindle unit and the proceeding of the spindle unit. A plurality of swing stopping devices for loosely holding the gun drill and suppressing the swing of the gun drill are arranged in a free zone between the chip box and the moving spindle unit, and each swing stopping device is configured to freely retract from a steady action position where the swing stopping action is performed so as to avoid interference with the spindle unit that moves in the free zone.

Further, the gun drill machine wherein, in addition to the above requirements, the swing stopping device includes a finger unit that directly and loosely holds the gun drill, and the finger unit opens and closes a pair of fingers to loosely hold and release the gun drill.

Furthermore, the gun drill machine wherein, in addition to the above requirements, the swing stopping device moves from a retraction position to the steady action position of the gun drill in a manner that the finger unit lies down.

Furthermore, the gun drill machine wherein, in addition to the above requirements, the swing stopping device includes a derricking arm and an opening/closing link supported by the derricking arm, the derricking arm is pivotably arranged on the bedside and pivotably supports the opening/closing link on the free end side of the derricking arm in an arm pivot at a base end of the derricking arm, the finger unit includes a finger arranged on the derricking arm side and a finger on the opening/closing link side, and a shift device performs a derricking operation of the entire swing stopping device and opens and closes both fingers constituting the finger unit.

Furthermore, the gun drill machine wherein, in addition to the above requirements, the opening/closing link in the swing stopping device is pivotably arranged on the derricking arm in an opening/closing link pivot which is located at an intermediate portion of the opening/closing link, the finger is formed on the free end side of the opening/closing link, a shift receiving part is formed on the rear end part side of the opening/closing link, and a shift rod of a shift cylinder that pulls up the derricking arm in the standing/retracting direction is connected to the shift receiving part; the swing stopping device loosely holds the gun drill with the finger unit at an extended position of the shift rod, due to the contraction of the shift rod, the opening/closing link is pivoted around the opening/closing link pivot so as to make the finger on the opening/closing link side retract to an open jaw state, and subsequently, the entire derricking arm is pivoted and shifted in the standing direction.

Furthermore, the gun drill machine wherein, in addition to the above requirements, the swing stopping device includes a slide unit arranged in the free zone, a finger unit arranged on the free end side of the slide unit, and a shift device for driving the slide unit; the slide unit moves on the bed in a direction orthogonal to the arrangement direction of the gun drill and moves to the steady action position where the finger unit loosely holds the gun drill; and further, the finger unit loosely holds and releases the gun drill when the fingers constituting the finger unit open and close.

Furthermore, the gun drill machine wherein, in addition to the above requirements, the plurality of swing stopping devices have fixed arrangement positions in a longitudinal direction of the free zone.

Advantageous Effects of Invention

First, as the perforation by the gun drill proceeds, the spindle unit gets close to the chip box side and narrows the free zone, but at that time, the swing stopping device can retract so as to avoid interference with the spindle unit, and the spindle unit can be brought as close as possible to the chip box side. As a result, the length of the gun drill can be made shorter than before, and the stabilization of perforation action can be achieved.

Further, when the gun drill is loosely held by the finger unit having a pair of fingers, the setting and retracting of the swing stopping device can be performed smoothly, and a stable swing stopping action can be expected.

Further, when the swing stopping device having a link type configuration holds the gun drill at a lying position, and the space behind the position where the gun drill is arranged can be effectively used.

Further, when the fingers arranged oppositely in the swing stopping device are arranged separately on the derricking arm that performs the derricking operation and the opening/closing link arranged on the derricking arm, and the movement of the finger unit during action and non-action is rationally performed.

Further, when the swing stopping device opens and closes the finger unit and causes the derricking arm to lie down and stand up by one shift cylinder, and a simple drive form can be obtained.

Further, when the movement of the swing stopping device is a simple slide movement, and a simple configuration can be adopted as a whole. Therefore, a large number of swing stopping devices can be densely arranged even in a case that the hole length is short and the free zone is short, such as a case in which the diameter of the gun drill is extremely small, for example, 1 mm or less.

Further, a plurality of swing stopping devices are stationarily arranged in the longitudinal direction of the free zone respectively, and a reliable arrangement mode can be obtained.

DESCRIPTION OF EMBODIMENTS

The best embodiment of the present invention is as described in the following examples, but it is also possible to make appropriate changes within the scope of technical ideas of the present invention.

In addition, in the following description, first, the configuration of a gun drill machine 1 of the present invention is described, and then the operation mode of the device is described.

Figure 1:
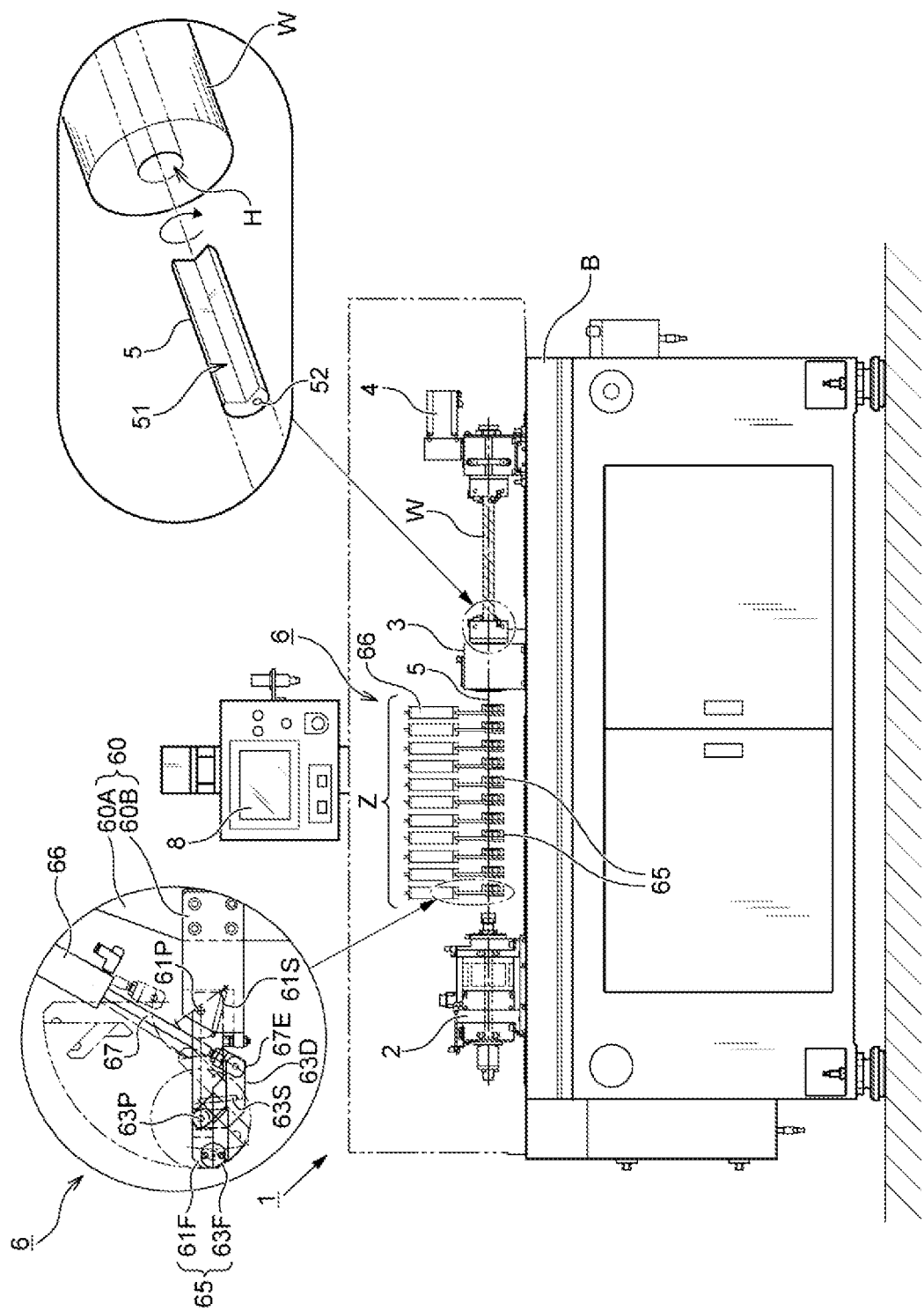
FIG. 1 is a front view showing a gun drill machine of the present invention, and includes a side view and a perspective view showing a part of the gun drill machine in an enlarged manner.
Figure 2:
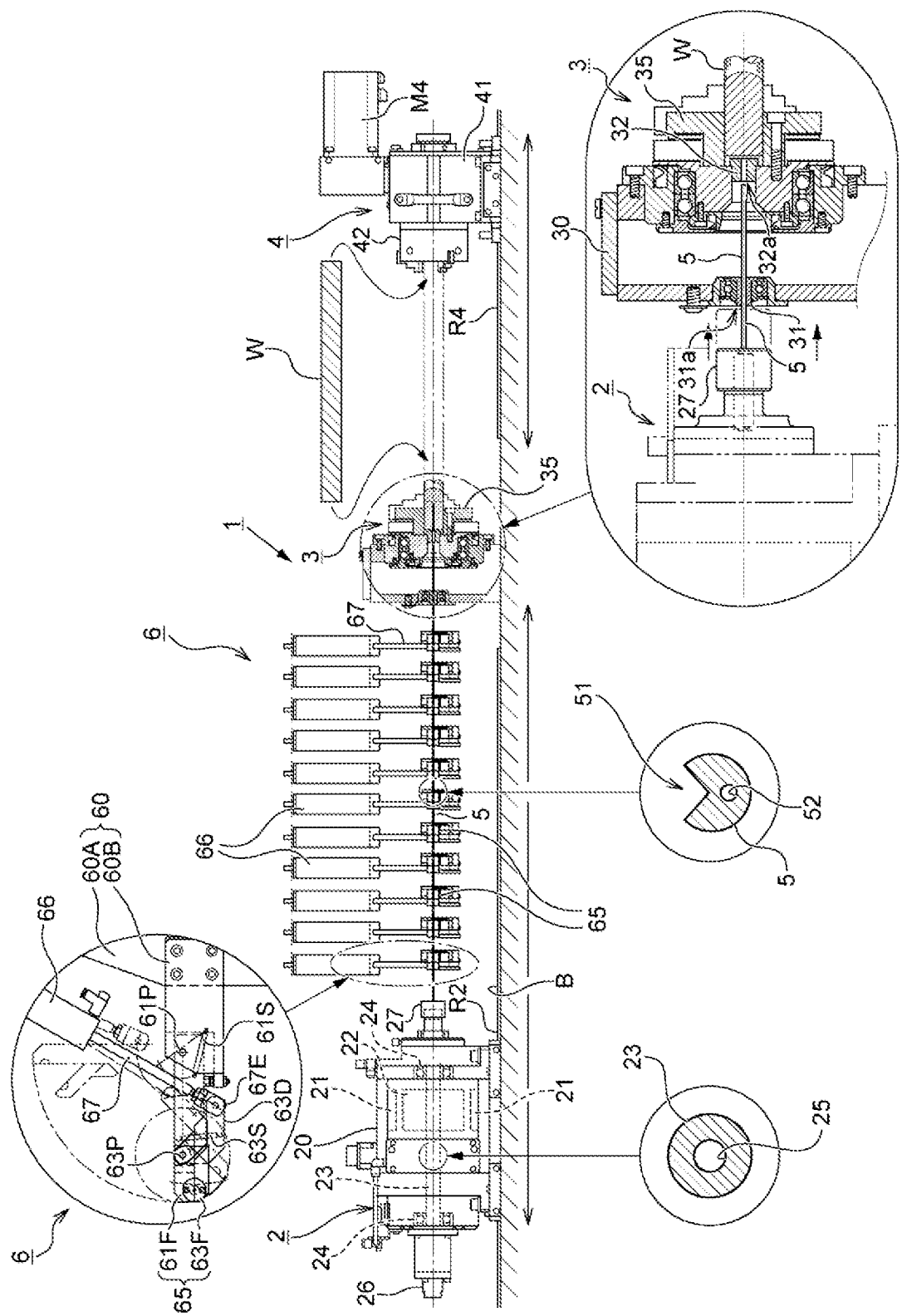
FIG. 2 is a front view showing the above gun drill machine, and also shows part of a spindle unit, a link type swing stopping device, a chip box and a workpiece holder in an enlarged manner.
Figure 3:
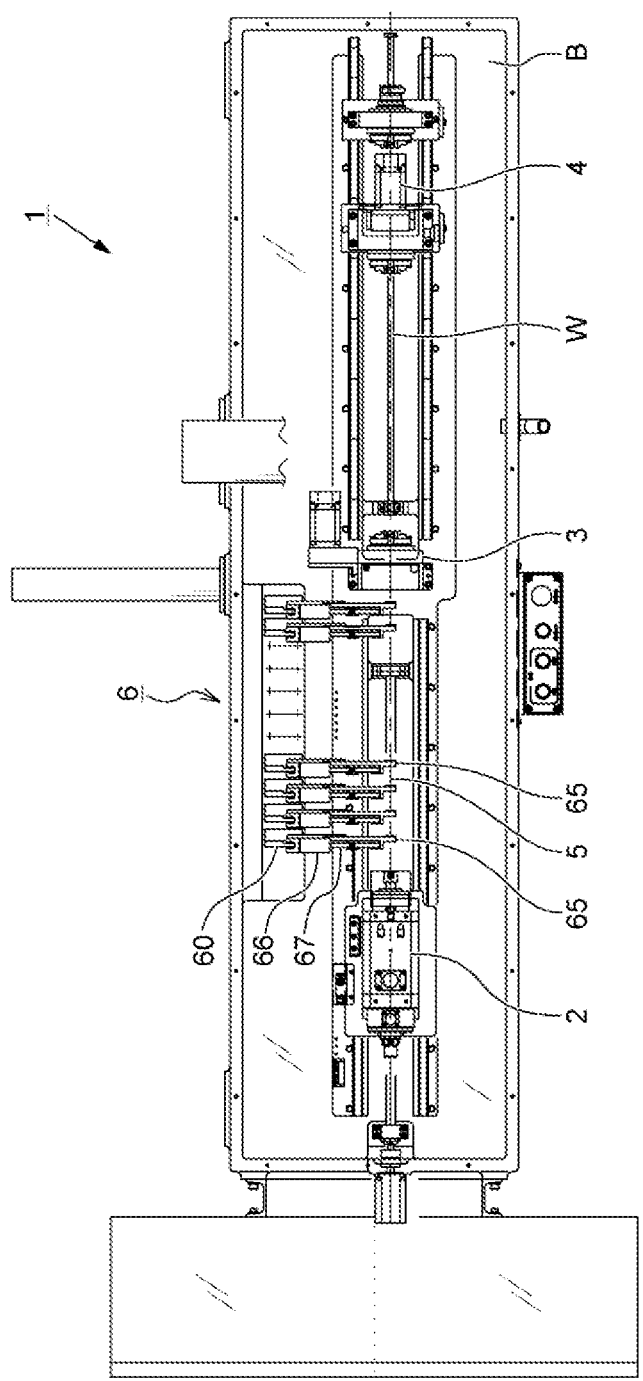
FIG. 3 is a plan view showing the gun drill machine of the present invention.
Figure 4:
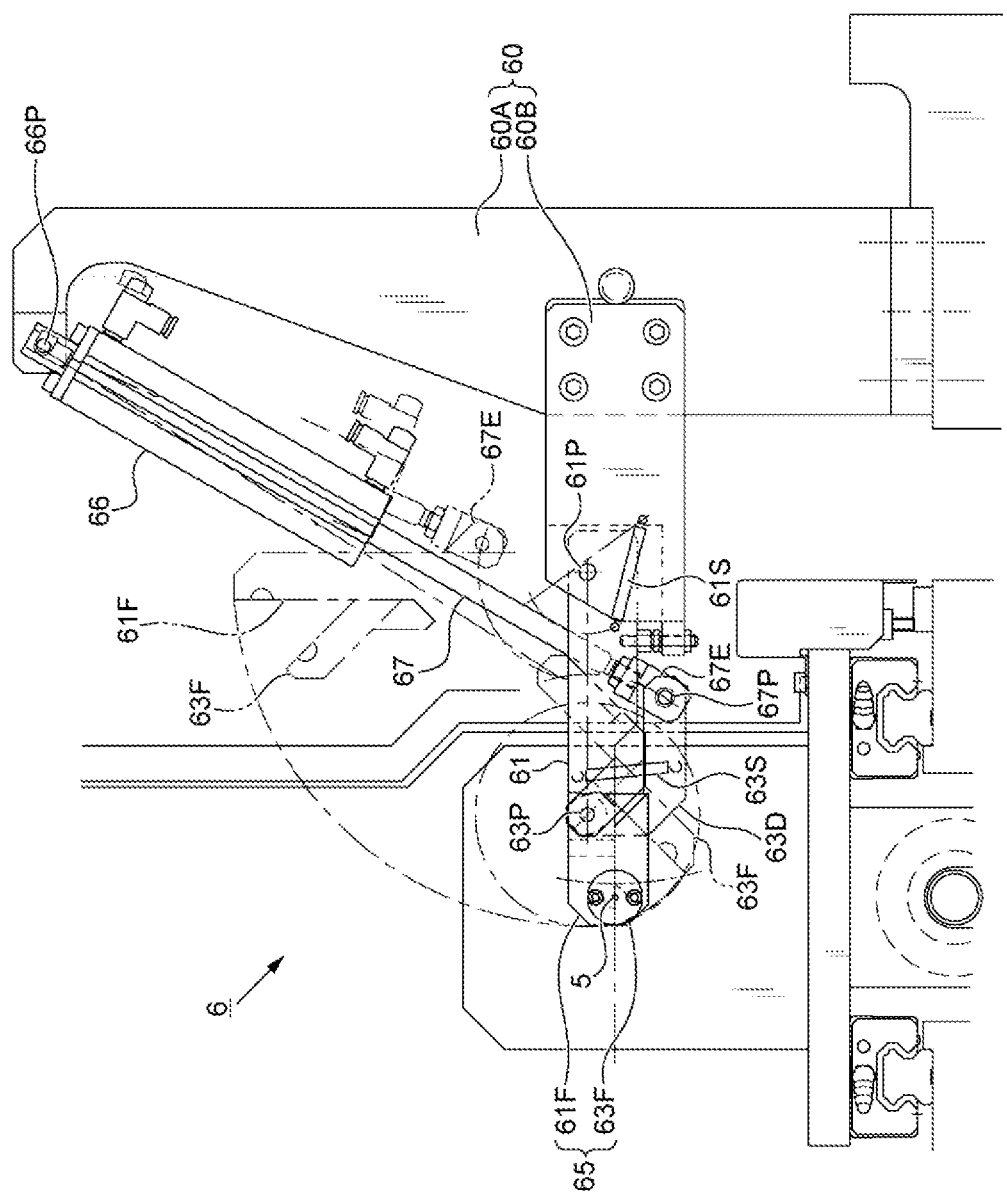
FIG. 4 is a side view showing a link type swing stopping device in an enlarged manner.
Figure 5:
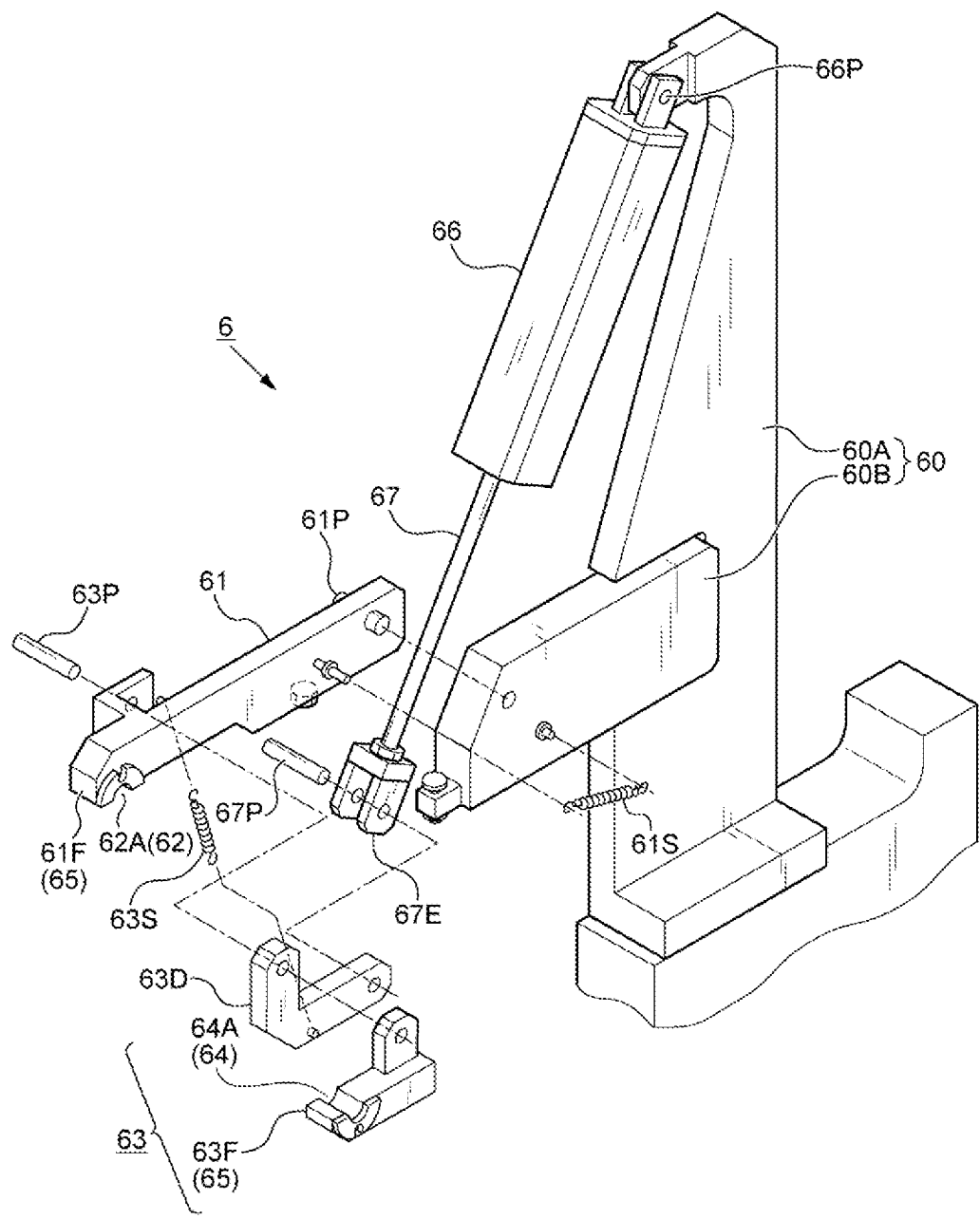
FIG. 5 is an exploded perspective view showing the link type swing stopping device.

As shown in FIG. 1 and FIG. 2, the outline of the gun drill machine 1 includes a bed B, a spindle unit 2 that holds a gun drill 5 and moves in a range from a moving start to a moving end on the bed B, a chip box 3 that is arranged at the moving end of the spindle unit 2 and rotatably supports the gun drill 5, a workpiece holder 4 arranged adjacent to the chip box 3 on the opposite side of the spindle unit 2, and a swing stopping device 6 (7) that loosely holds the gun drill 5 between the spindle unit 2 and the chip box 3.

With the gun drill machine 1, the front end of the gun drill 5 held by the spindle unit 2 is brought to a workpiece W held by the workpiece holder 4 from the chip box 3, and a deep hole H is drilled on the workpiece W by the rotation of a spindle 23 in the spindle unit 2 and the proceeding of the spindle unit 2.

Besides, a plurality of swing stopping devices 6, 7 are arranged in the axial direction of the gun drill 5 in a free zone Z between the chip box 3 and the moving spindle unit 2, and each of the swing stopping devices 6, 7 is configured to be capable of freely retracting, so as to avoid interference with the spindle unit 2, from a position in which the swing stopping devices 6, 7 loosely hold the gun drill 5.

Hereinafter, each element constituting the gun drill machine 1 is described in detail.

First, as an example, the spindle unit 2 has the same configuration as that disclosed in Japanese Patent Laid-Open No. 2012-86312 "Gun Drill Machine", which is a patent application filed by the present applicant. Specifically, as shown in FIG. 2, a stator 21 and a rotor 22 are included in a casing 20, and the spindle 23 in the rotor 22 is pivotally supported by a pair of bearings 24 included on both ends of the casing 20 and facing each other.

Besides, an oil hole 25 is formed in a manner of penetrating the axial center of the spindle 23. Furthermore, an oil supply pipe 26 is connected to one end of the spindle 23, and a nut 27 for chuck of the gun drill 5 is connected to the other end of the spindle 23.

In addition, the spindle unit 2 configured in the above way can be moved on a rail R2 laid on the bed B along the axial direction of the spindle 23 by a ball screw mechanism or the like (not shown).

Next, the chip box 3 is an apparatus for rotatably supporting the front end side of the gun drill 5, collecting chips generated from the workpiece W, and further holding the workpiece W, and is fixedly arranged between the spindle unit 2 and the workpiece holder 4 on the bed B.

Specifically, as shown in FIG. 2, a chuck 35 is rotatably included on one side part of a casing 30, and a gizmo seal 31 is rotatably included on the opposite side of the chuck 35. Then, the gun drill 5 is inserted through a drill hole 31a in the gizmo seal 31 and a drill hole 32a in a drill bush 32, and the front end of the gun drill 5 protruding from the drill hole 32a acts on the workpiece W in contact with the drill bush 32.

In addition, it is also possible to arrange a support bush in which a drill hole is formed between the gizmo seal 31 and the drill bush 32 to further ensure the holding of the gun drill 5.

Next, the workpiece holder 4 is an apparatus for holding the workpiece W processed by the gun drill machine 1 between the chip box 3 and the workpiece holder 4, and further has a configuration in which the workpiece W is rotated in a direction opposite to the rotation direction of the gun drill 5 in this embodiment.

Specifically, as shown in FIG. 2, with respect to an output axis of a relative rotation unit 41 formed by appropriately combining gears, a chuck 42 and a motor M4 for driving the relative rotation unit 41 are included.

Besides, in the workpiece holder 4, the chuck 42 is arranged in a manner of facing the chuck 35 in the chip box 3. Furthermore, The workpiece holder 4 is configured to be capable of adjusting the distance between the chuck 42 and the chuck 35 and holding workpieces W of various lengths by moving on a rail R4 laid on the bed B along the axial direction of the spindle 23 in the spindle unit 2.

In addition, as a form of the workpiece holder 4, a table configuration in which the workpiece W is in a fixed state without being rotated can also be adopted.

Next, the gun drill 5 is a drill for deep hole processing (L/D value 20 to 200), and particularly as an example of a difficult processing requirement specification, a relatively hard stainless or titanium material is used as the workpiece W, and a gun drill 5 which can drill a deep hole H having a diameter of 1 mm or less and a hole length of more than 200 mm is assumed.

In the case of the above specification, the total length of the gun drill 5 is about 300 mm including a margin part not directly involved in hole-drilling, but according to the present invention, the length of the margin part can be made into about half, and the total length can be, for example, about 250 mm.

Then, as shown in an enlarged view of FIG. 2, the cross-sectional shape of the gun drill 5 is formed into a V-groove 51 which resembles a circular shape cut by about ¼ circumference, and is not a perfect circular cross-sectional shape.

Further, one or a plurality of oil holes 52 are formed in a manner of penetrating the gun drill 5 in the axial direction.

In addition, in FIG. 2, the axial center of the oil hole 25 in the spindle 23 and the axial center of the oil hole 52 in the gun drill 5 are deviated from each other, but because the nut 27 for chuck is interposed between the oil hole 25 and the oil hole 52, by arranging a cutting oil reservoir in the nut 27, the cutting oil moves smoothly from the oil hole 25 to the oil hole 52.

Next, the swing stopping devices 6, 7 which are main target configurations of the present invention are described. The swing stopping devices 6, 7 are devices for suppressing a state of a skipping rope phenomenon or a ballooning phenomenon in which the gun drill 5 bends like a spindle due to high-speed rotation of, for example, about 12000 rpm of the gun drill 5.

The swing stopping devices 6, 7 of the present invention are configured to be capable of retracting, to avoid interference with the spindle unit, from a steady action position where the gun drill 5 is loosely held, and there are two types of configurations. One is a link type swing stopping device 6 whose movable mode is a combination of links, and the other is a slide type swing stopping device 7 whose movable mode moves horizontally as an example.

"Link Type Swing Stopping Device"

First, the configuration of the link type swing stopping device 6 is described with reference to FIG. 1 to FIG. 6, and FIG. 11. The swing stopping device 6 is arranged in a back space of an actual processing working space of the spindle unit 2 or the gun drill 5 in the gun drill machine 1, and has a plurality of support posts 60 arranged in parallel along the free zone Z as frame members. The support post 60 has a cylinder support 60A at an upper portion and an arm support 60B at a portion extending from near the intermediate height to the front side. First, a derricking arm 61 is pivotably arranged with respect to this support post 60. That is, the derricking arm 61 is, for example, a long plate-shaped member, and the base of the derricking arm 61 is an arm pivot 61P where the derricking arm 61 is pin-connected to the arm support 60B in the support post 60.

As a result, the derricking arm 61 is configured to be capable of pivoting around the lower end from a substantially horizontal steady action position to a retraction position standing up toward a free end under the action of a shift cylinder 66 described later.

Moreover, a finger 61F which is one of a finger unit 65 for loosely holding the gun drill 5 is arranged on the free end side of the derricking arm 61. The finger 61F on the derricking arm 61 side fixes a swing stopping guide 62 made of a material suitable for the gun drill 5 so as not to hinder the smooth rotation of the gun drill 5, and a guide groove 62A serving as a housing part of the gun drill is formed in the swing stopping guide 62. In addition, the numeral 61S is an arm set spring stretched between the arm support 60B and the lower side of the derricking arm 61, the arm set spring 61s holds the posture of the derricking arm 61 at the retraction position, and slightly urges the derricking arm 61 to lie down after the derricking arm 61 begins to tilt.

An opening/closing link 63 including a finger 63F which is the other one of the finger unit 65 is pivotably attached to the derricking arm 61. That is, the opening/closing link 63 is a plate-shaped link member that can be expressed as a deformed three-pronged shape if the opening/closing link 63 is forcibly expressed, an opening/closing link pivot 63P is formed at a portion protruding upward in the intermediate part of the opening/closing link 63 in the drawing, and at the opening/closing link pivot 63P, the derricking arm 61 is pivotably pin-connected to a position closer to the free end side of the derricking arm 61 and behind the finger 61F. The free end side of the opening/closing link 63 is made to be the finger 63F on the opening/closing link side, and a swing stopping guide 64 having a guide groove 64A as in the finger 61F on the derricking arm side is fixed to the finger 63F. The pair of fingers 61F and 63F form a pair to constitute the finger unit 65.

Further, a rear protruding portion of the opening/closing link 63 is a shift passive part 63D, and a shift rod 67 of the shift cylinder 66 described later is pin-connected to the portion. In addition, the numeral 63S is a link set spring for urging the finger 63F on the opening/closing link side to be constantly open.

Next, the shift cylinder 66 for lying and raising the derricking arm 61 including the opening/closing link 63 is described. In the example, the shift cylinder 66 is arranged in a state in which the shift rod 67 is directed downward and slightly tilted backward from the upright state, and first, a cylinder pivot 66P in the above is pin-connected to the upper end of the cylinder support 60A of the support post 60. On the other hand, the shift rod 67 directed downward pin-connects a rod end 67E thereof to the shift passive part 63D of the opening/closing link 63 in a rod pivot 67P.

As the shift cylinder 66, an air cylinder is preferable as an example in terms of control and maintenance, but a hydraulic cylinder, a motor cylinder, or the like may also be used. Certainly, other torque actuators and the like can be applied as long as operations required for the pivoting of the derricking arm 61, the pivoting of the opening/closing link 63, and the like can be achieved.

Figure 6:
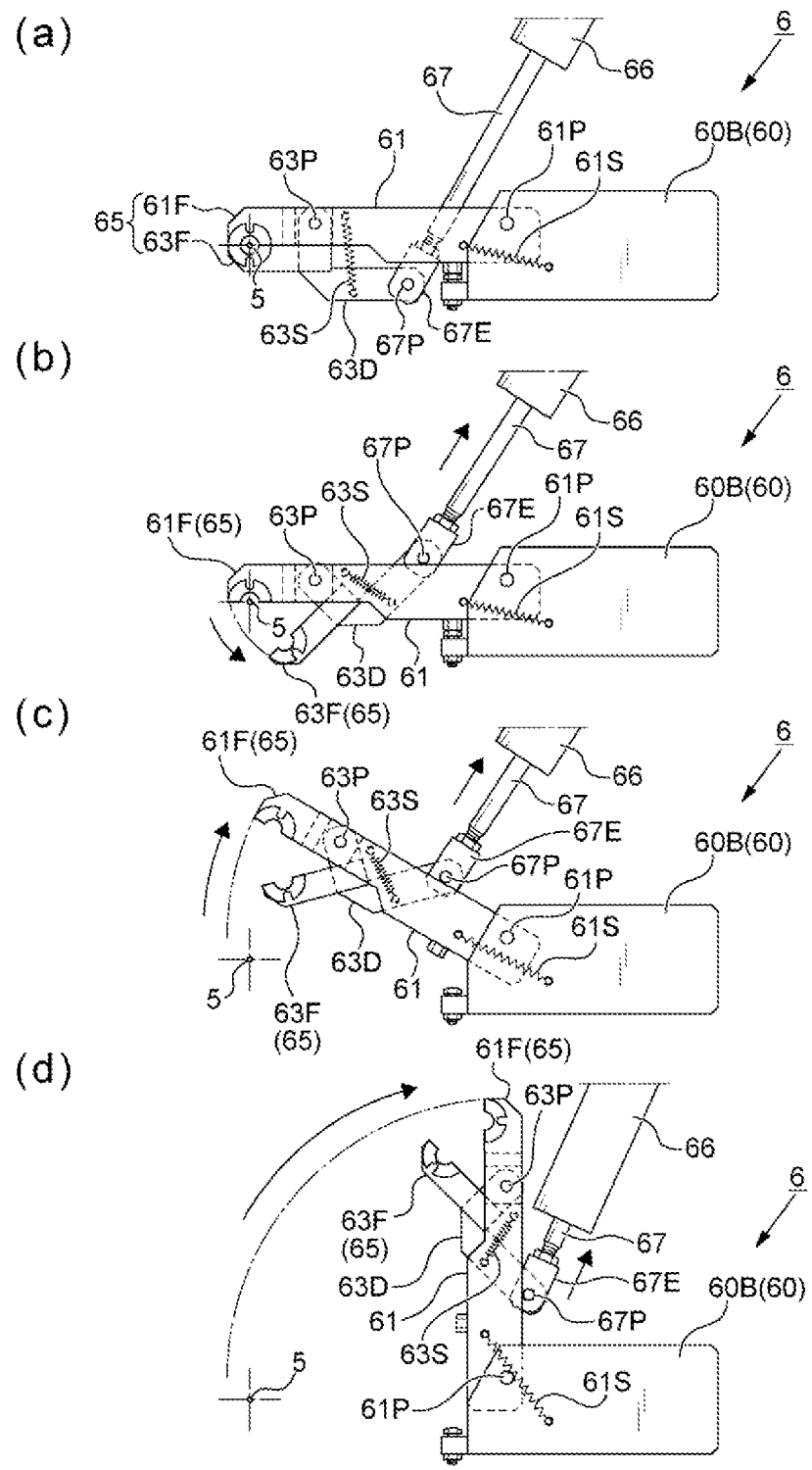
FIG. 6 is a side view showing the movement of the link type swing stopping device step by step.

Here, the operating state of the link type swing stopping device 6 is described with reference to FIG. 6.

i) Swing Stopping Device Initial State

As shown in FIG. 6(a), the initial state is a steady action state, i.e. a state in which the finger unit 65 loosely holds the gun drill 5. In the initial state, the shift rod 67 of the shift cylinder 66 is in a fully extended state, the derricking arm 61 is in a state of being lying down almost horizontally, and the fingers 61F, 63F of the finger unit 65 are in a closed state. Then, in the finger unit 65, due to the presence of the guide grooves 62A, 64A shown in FIG. 5, a guide hole for the gun drill 5 is secured, and the gun drill 5 is loosely held. As is clear from the plan view of FIG. 3 about the state, because the swing stopping device 6 is in a position where the swing stopping device 6 interferes with the spindle unit 2, a retraction operation from the position is performed next in order to avoid the interference.

ii) Retraction Operation of Swing Stopping Device

The retraction operation of the swing stopping device 6 is performed by using the shift cylinder 66 as an actuator, and operates the shift rod 67 in the shift cylinder 66 from an extended state to a contracted state.

ii-1) Opening of Opening/Closing Link

At this time, because the shift rod 67 is not directly connected to the derricking arm 61 but is connected to the opening/closing link 63 at the shift passive part 63D, in the contraction operation of the shift rod 67, first, the opening/closing link 63 is pivoted around the opening/closing link pivot 63P with the finger 63F directed obliquely downward. That is, the finger 63F takes a movement so as to be like an open jaw with respect to the finger 61F on the derricking arm 61 side, and first releases the holding of the lower side of the gun drill 5 as shown in FIG. 6(b).

ii-2) Raising of Derricking Arm

Then, as shown in FIG. 6(e), when the shift rod 67 further contracts, the shift passive part 63D of the opening/closing link 63 is pulled up, and the movement is substantially transmitted to the derricking arm 61 via the opening/closing link pivot 63P and acts to raise the free end side of the derricking arm 61. As a result, the derricking arm 61 lifts the free end side thereof around the arm pivot 61P, and finally, as shown in FIG. 6(d), when the shift rod 67 of the shift cylinder 66 is completely contracted, the derricking arm 61 becomes substantially upright, and the derricking arm 61 is maintained upright in this state.

Further, when the derricking arm 61 rises, the lower opening/closing link side finger unit 63F of the finger unit 65 moves obliquely downward to retract to an open jaw state as described above and retracts behind the position where the gun drill 5 is placed, and the interference with the gun drill 5 is sufficiently avoided.

iii) Re-Holding by Swing Stopping Device

In order to loosely hold the gun drill 5 again from the retraction state of the swing stopping device 6, the shift rod 67 of the shift cylinder 66 is extended in the reverse of the previous retraction operation. By the operation, as shown in FIG. 6(b), first, the derricking arm 61 lies down to the horizontal position, and the finger 61F which is the front end of the derricking arm 61 holds the gun drill 5 from above. Then, when the shift rod 67 continues to further extend, the opening/closing link 63 pivots clockwise as in the drawing around the opening/closing link pivot 63P, and as shown in FIG. 6(a), the finger 63F is shifted to a so-called closed jaw state, and the gun drill 5 is loosely held by the finger 63F and the finger 61F.

"Slide Type Swing Stopping Device"

Next, the slide type swing stopping device 7 being another form is described, and thereafter the operation mode of the entire gun drill machine 1 is described. The slide type swing stopping device 7 has two examples, one example is a double cylinder type shown in FIG. 7, FIG. 8 and FIG. 9, in which the shift and the slide shift of a finger unit 75 are performed by separate actuators. Further, the other example is a single cylinder type shown in FIG. 10, which uses only one slide shift cylinder 78 as an actuator to perform the slide shift and the opening/closing of the finger unit.

<Double Cylinder Type>

Figure 7:
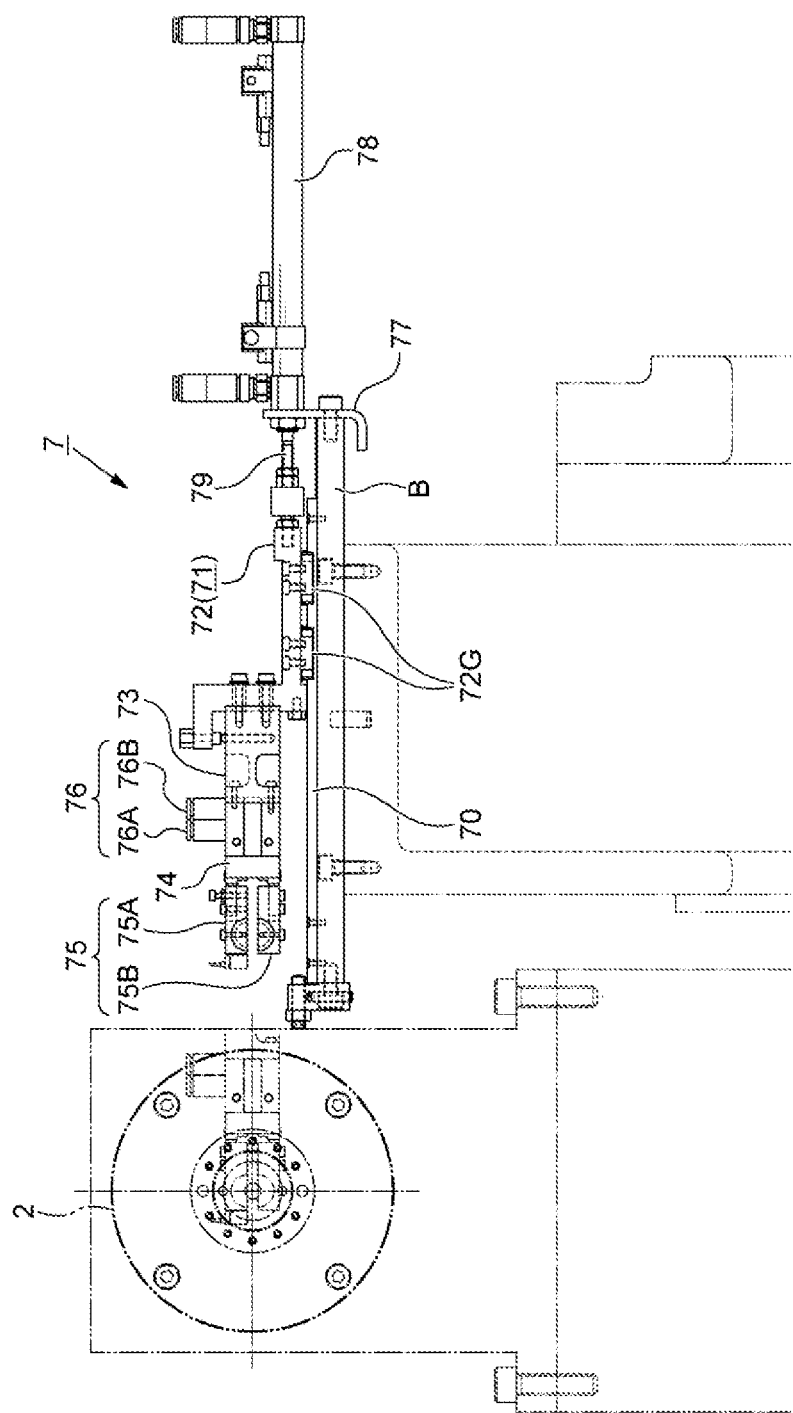
FIG. 7 is a side view showing a slide type swing stopping device.
Figure 8:
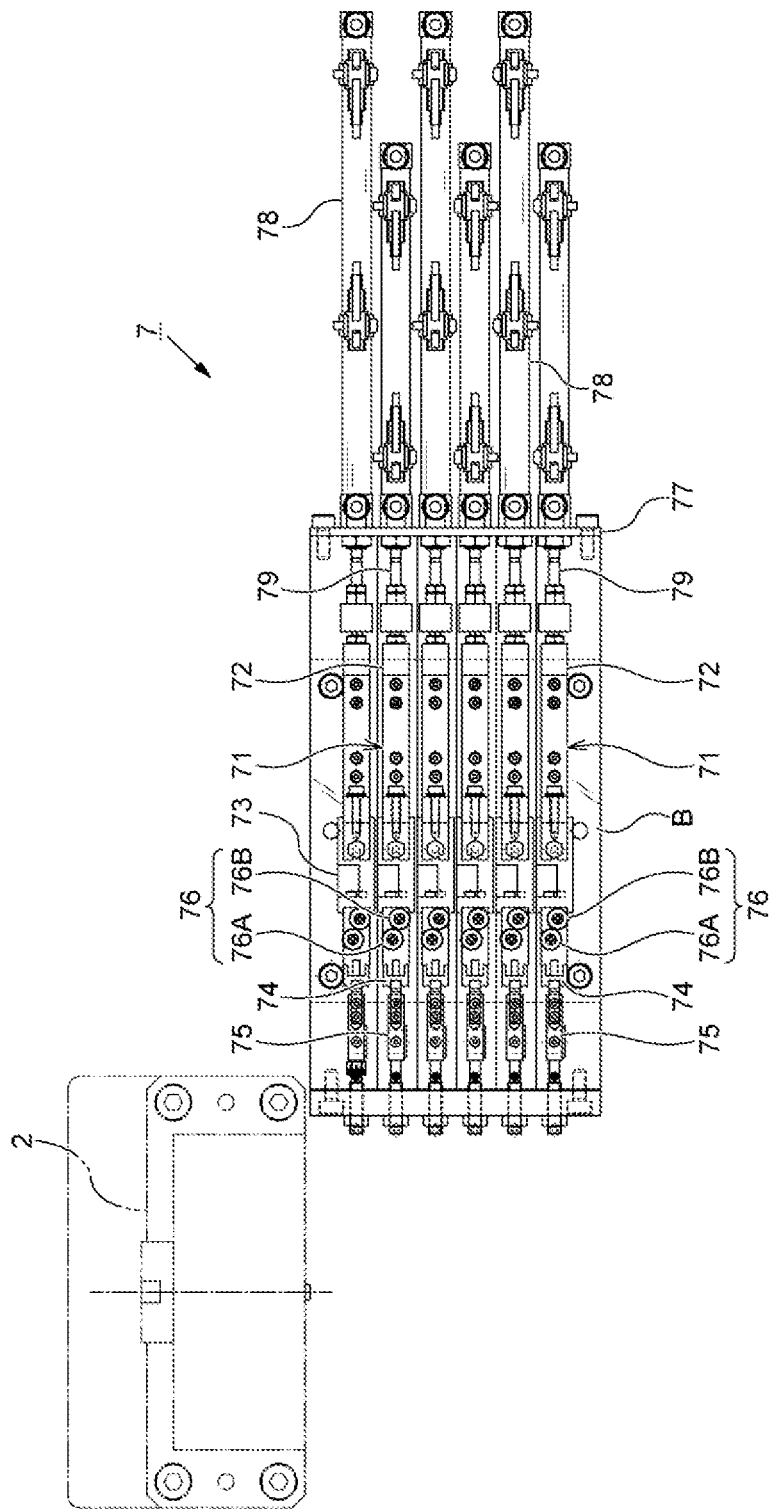
FIG. 8 is a plan view showing the slide type swing stopping device.
Figure 9:
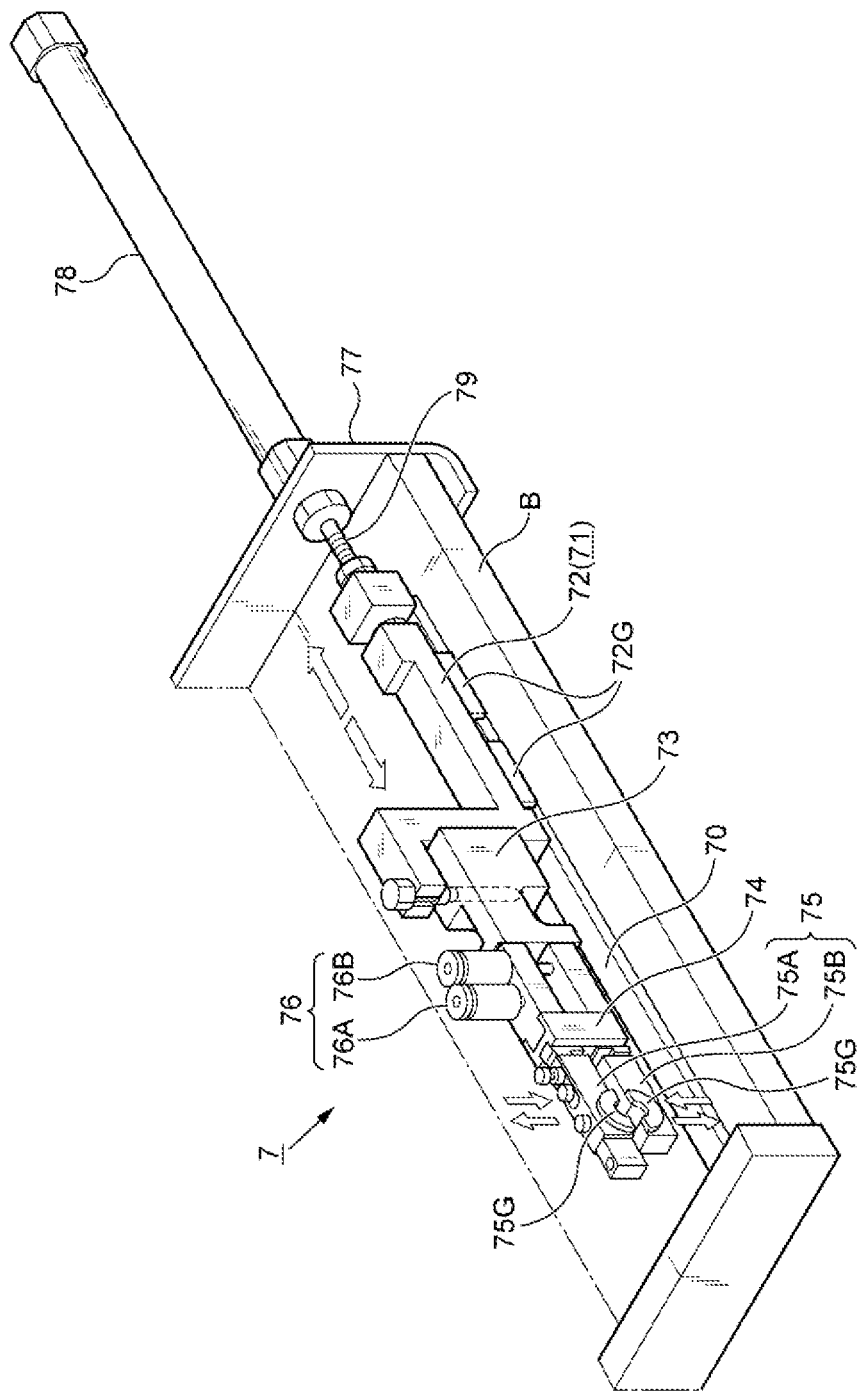
FIG. 9 is a perspective view showing the slide type swing stopping device.

First, the example in which the shift and the slide shift of the finger unit are performed by separate actuators is described. As shown in FIG. 7, FIG. 8, and FIG. 9, in the double cylinder type, a guide rail 70 is arranged on the bed B in a manner of being orthogonal to the arrangement direction of the gun drill 5, and a slide unit 71 is arranged so as to be slidable with respect to the guide rail 70.

The slide unit 71 includes a linear guide 72G that is directly fitted to the guide rail 70 on the lower surface of a slide block 72 which is a part of the slide unit 71, and includes a finger support 73 in front of the linear guide 72G. Further, the slide shift cylinder 78 which is a shift device described later is arranged behind the slide unit 71, and the slide shift cylinder 78 performs the slide shift of the slide unit 71.

The finger support 73 which is a member in front of the slide unit 71 is a member that extends forward in a floating manner from the guide rail 70, and includes the finger unit 75 having a pair of an upper finger 75A and a lower finger 75B at the front end of the finger support 73 via an opening/closing guide part 74.

That is, as shown in FIG. 7 and FIG. 8, the pair of fingers 75A and 75B moves in a vertically contrasting manner to approach and separate from each other. The linear movement in the vertical direction is obtained by the opening/closing guide part 74, and a mutually meshed or dovetail groove-like guide means is adopted. Then, similarly to the link type swing stopping device 6, each of the upper finger 75A and the lower finger 75B includes a swing stopping guide 75G at the front end part thereof. Further, the pair of the upper finger 75A and the lower finger 75B is shifted vertically facing each other, and a finger shifter 76 is arranged at the rear as a driving member of the fingers 75A and 75B.

The finger shifter 76 has an upper finger shifter 76A that shifts the upper finger 75A and a lower finger shifter 76B that shifts the lower finger 75B, and the upper finger shifter 76A and the lower finger shifter 76B are arranged in parallel.

Next, a shift device for slide-shifting the entire slide unit 71 is described. A cylinder support 77 is arranged at the rear end part of the bed B, and the slide shift cylinder 78 which is the shift device is attached to the cylinder support 77.

Similar to the shift cylinder 66 described above, it is preferable to use an air cylinder as the slide shift cylinder 78, but other hydraulic cylinders and motor cylinders may also be used. Further, the forward/backward movement of the slide unit 71 may be driven by a rack and pinion mechanism or the like without applying the cylinder type as the shift device. Then, the front end part of the shift rod 79 is connected to the slide block 72 of the slide unit 71, and the entire slide unit 71 is driven to slide back and forth by the expansion and contraction of the shift rod 79.

The operating state of the slide type swing stopping device 7 having the above-described configuration is described.

i) Initial State

The initial state is described with the steady action state of the swing stopping device 7 as the initial state, and in the initial state, the slide unit 71 receives the extension of the shift rod 79 and is located at a most forward protruding position. Then, the upper finger 75A and the lower finger 75B of the finger unit 75 at the most front end part approach each other to loosely hold the gun drill 5 and exert the swing stopping action of the finger unit 75.

ii) Retraction Operation of Swing Stopping Device

On the other hand, in order that the swing stopping device 7 retracts, first, the upper finger shifter 76A and the lower finger shifter 76B of the finger shifter 76 are caused to act so as to move the upper finger 75A and the lower finger 75B in the vertical direction facing each other, respectively. Thereby, the holding of the gun drill 5 by the finger unit 75 is released.

When the shift rod 79 of the slide shift cylinder 78 is contracted in this state, the slide unit 71 connected to the shift rod 79 moves backward along with the finger unit 75.

iii) Return Operation (Loose Holding of Gun Drill)

This operation is performed in a reverse order of the retraction operation. First, the slide unit 71 proceeds due to the slide shift cylinder 78, and then the finger unit 75 operates to loosely hold the gun drill 5.

<Single Cylinder Type>

Next, an example of a single cylinder type in which the slide shift of the slide unit 71 and the shift of the finger unit 75 are performed by only one slide shift cylinder 78 is described.

Figure 10:
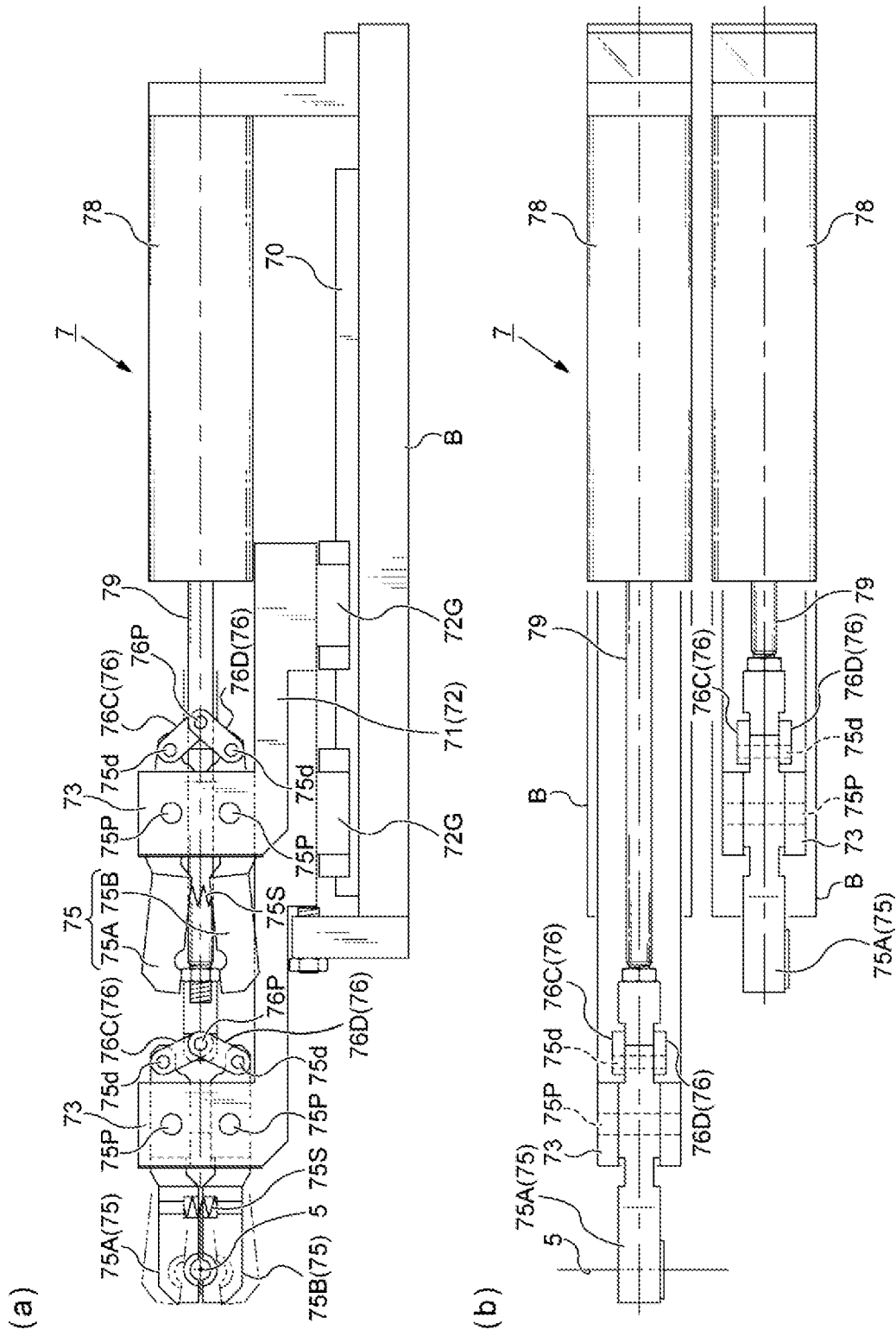
FIG. 10 is a side view and a plan view showing another embodiment of the slide type swing stopping device.

The single cylinder type swing stopping device 7 is shown in FIG. 10 in a side view (a) and a plan view (b). In addition, the same reference signs are given to members that are common to the previous double cylinder type swing stopping device 7. The slide unit 71 is substantially the same and slides on the guide rail 70 arranged on the bed B in a direction orthogonal to the extension direction of the gun drill 5. Then, the finger support 73 is arranged at the front end of the slide unit 71 to support the upper finger 75A and the lower finger 75B, and the finger unit 75 is pivotably attached so as to perform a scissor-like action with a tendency to expand constantly.

That is, each of the upper and lower integrated fingers 75A and 75B has the base part side thereof pivotably supported at a finger pivot 75P with respect to the finger support 73, and is given a tendency to expand constantly by a set spring 75S. Further, the rear end part of each of the fingers 75A and 75B serves as a shift receiving pivot 75d and has the finger shifter 76 connected thereto.

In addition, the finger shifter 76 includes link pieces 76C, 76D that are pivotably connected to the shift rod 79 in the slide shift cylinder 78 supported on the bed B side and are combined in a V-shape in a side view. Each of the link pieces 76C, 76D has a focusing part serving as a shift pivot 76P and pin-connected to the shift rod 79.

As can be understood from the configuration, in this example, the approach and separation of the swing stopping device 7 to and from the gun drill 5 side and the loose holding and release of the gun drill 5 through the finger unit 75 are performed by one slide shift cylinder 78. The operations are described below.

i) Initial State

The initial state is described with the steady action state of the swing stopping device 7 as the initial state, and the slide unit 71 receives the extension of the shift rod 79 and is located at a most forward protruding position. Then, the upper finger 75A and the lower finger 75B of the finger unit 75 at the most front end part approach each other to loosely hold the gun drill 5 and exert the swing stopping action of the finger unit 75. At this time, the upper finger 75A and the lower finger 75B are in a loosely holding state against the set spring 75S.

ii) Retraction Operation of Swing Stopping Device

In this operation, first, the shift rod 79 of the slide shift cylinder 78 is contracted. In response to the operation, the upper finger 75A and the lower finger 75B, which tend to expand constantly, expand the front end side of the fingers 75A, 75B according to repulsion force of the set spring 75S. Then, when the shift rod 79 continues to further contract, the slide unit 71 retracts as if being pulled by the shift rod 79.

iii) Return Operation (Loose Holding of Gun Drill)

This operation is performed in a reverse order of the retraction operation of the swing stopping device 7, and first the slide unit 71 proceeds due to the extension of the shift rod 79. At this time, the upper finger 75A and the lower finger 75B of the finger unit 75 are in a state of being expanded by the set spring 75S.

After that, when the slide unit 71 is pushed to the most front end, the slide unit 71 stops there, and then the finger shifter 76, which has received further proceeding of the shift rod 79, expands the shift receiving pivot 75d side against the set spring 75S when the shift pivot 76P is pressed. That is, the upper finger 75A and the lower finger 75B pivot at the finger pivot 75P so that the fingers 75A and 75B are closed respectively to loosely hold the gun drill 5, and the initial state is obtained.

The configurations and actions of the link type and the slide type have been described respectively in the above. As shown in FIG. 1, the gun drill machine 1 of the present invention includes a control panel 8 for controlling the spindle unit 2, the workpiece holder 4, the swing stopping devices 6, 7, and the like.

The gun drill machine 1 of the present invention is configured as described above as an example, and the operation mode of the entire device is described below with reference to FIG. 11.

i) Preparation Work

Main preparation works are the setting of the workpiece W and the attachment of the gun drill 5.

First, as for the workpiece W, as shown in FIG. 11(a), the position of the workpiece holder 4 is set to an appropriate position according to the length of the workpiece W, and then as shown in FIG. 11(b), both ends of the workpiece W are held by the chuck 42 of the workpiece holder 4 and the chuck 35 on the chip box 3 side.

On the other hand, when attaching the gun drill 5, in the present invention, because both swing stopping devices 6, 7 are free to retract from the steady action position, all of the plurality of swing stopping devices 6, 7 have been kept in the retraction state described above.

In this state, the base part of the gun drill 5 on the drive side is fixed by the nut 27 for chuck on the spindle 23 side, the front end side of the gun drill 5 is inserted through the chip box 3, and the front end of the gun drill 5 is held in the drill bush 32.

In addition, in this work, because all the swing stopping devices 6, 7 can be left in the retraction state, it is easy to perform the setting work of the gun drill 5.

ii) Setting of Swing Stopping Device

After the gun drill 5 is attached, the swing stopping devices 6, 7 shift all the units into the steady action device as in the operation described above, and loosely hold the gun drill 5 by each of the finger units 65, 75.

In addition, at this time, depending on the length of the workpiece W, a part of the swing stopping devices 6, 7 near the spindle unit 2 may not work.

iii) Perforation by Gun Drill and Retraction of Swing Stopping Device

Next, when the gun drill 5 is driven, the front end of the gun drill 5 acts on the workpiece W to start the perforation action. In addition, in a perforation process, the workpiece W is fixed to the workpiece holder 4 having a table structure for example and only the gun drill 5 is rotationally driven, and besides, there is also a method in which the workpiece W side is rotated in a direction opposite to the gun drill 5.

Figure 11:
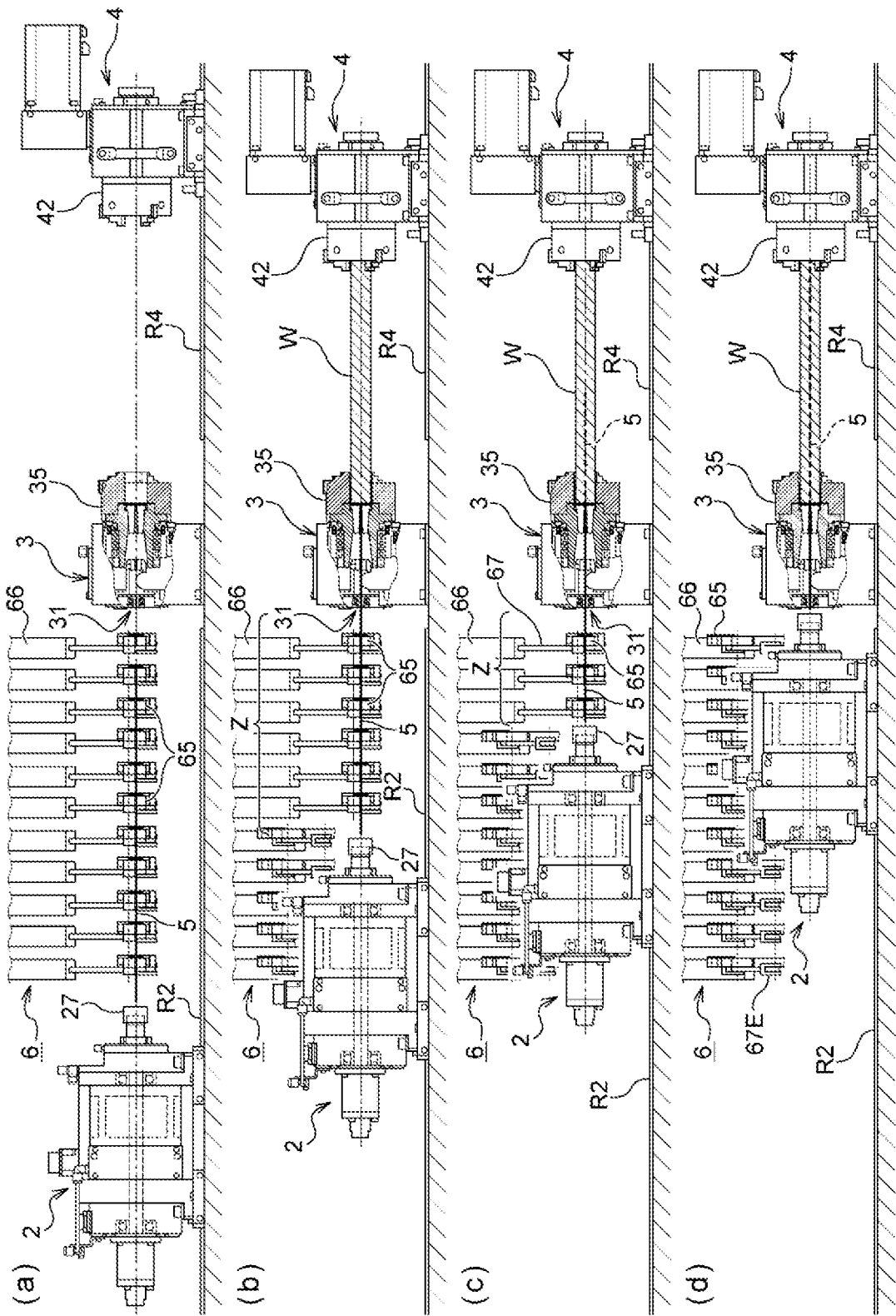
FIG. 11 is a side view showing the movements of the spindle unit, the link type swing stopping device, the chip box and the workpiece holder step by step.
Figure 12:
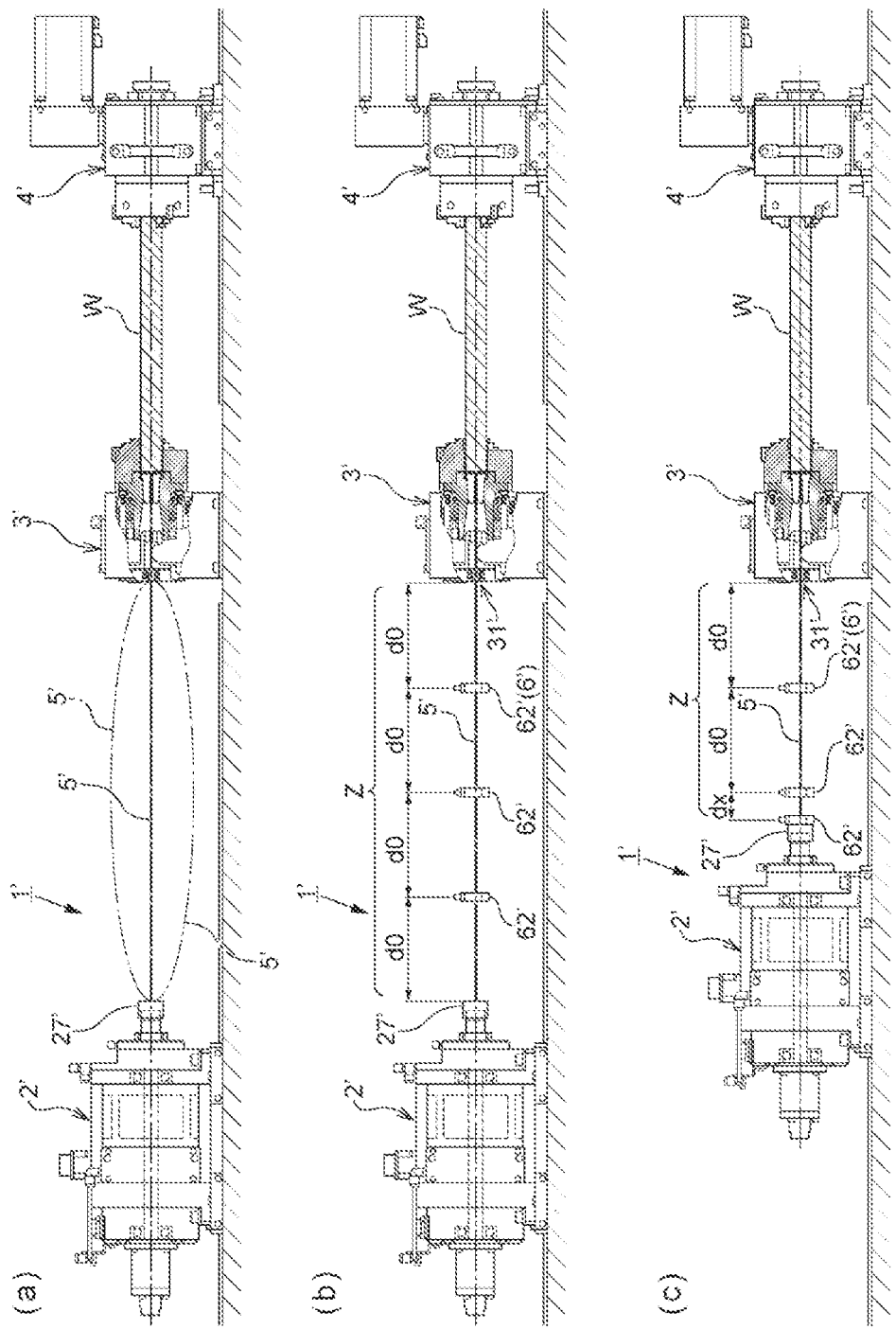
FIG. 12 is a front view showing a conventional gun drill machine and a conventional swing stopping device.

Then, as the perforation action proceeds, the spindle unit 2 moves to the workpiece W side as shown in FIG. 11, but in contrast, the swing stopping devices 6, 7 close to the spindle unit 2 side retract from the steady action position in order. Thereby, the spindle unit 2 avoids interference contact with the swing stopping devices 6, 7, and residual swing stopping devices 6, 7 stay in the free zone Z to support smooth rotation of the gun drill 5.

After that, when the perforation work is nearly completed, the last remaining swing stopping devices 6, 7 near the chip box 3 also retract, and the spindle unit 2 is brought to a position closest to the chip box 3.

As is clear from the operating mode, the total length of the gun drill 5 can be reduced to about a half of the margin dimension required conventionally, resulting in stable operation.

REFERENCE SIGNS LIST 1 gun drill machine
2 spindle unit
20 casing
21 stator
22 rotor
23 spindle
24 bearing
25 oil hole
26 oil supply pipe
27 nut (for chuck)
3 chip box
30 casing
31 gizmo seal
31a drill hole
32 drill bush
32a drill hole
35 chuck
4 workpiece holder
41 relative rotation unit
42 chuck
5 gun drill
51 V-groove
52 oil hole
6 swing stopping device (link type)
60 support post
60A cylinder support
60B arm support
61 derricking arm
61P arm pivot
61S arm set spring
61F (derricking side) finger
62 swing stopping guide
62A guide groove
63 opening/closing link
63F (opening/closing side) finger
63P opening/closing link pivot
63D shift passive part
63S link set spring
64 swing stopping guide
64A guide groove
65 finger unit 66 shift cylinder
66P cylinder pivot
67 shift rod
67E rod end
67P rod pivot
7 swing stopping device (slide type)
70 guide rail
71 slide unit
72 slide block
72G linear guide
73 finger support
74 opening/closing guide part
75 finger unit
75A (upper) finger
75B (lower) finger
75d shift receiving pivot
75G swing stopping guide
75P finger pivot
75S set spring
76 finger shifter
76A upper finger shifter
76B lower finger shifter
76C link piece
76D link piece
76P shift pivot
77 cylinder support
78 slide shift cylinder (shift device)
79 shift rod
8 control panel
d0 interval
dx interval
B bed
H deep hole
M4 motor
R2 rail
R4 rail
W workpiece
Z free zone

The invention claimed is:

1. A gun drill machine comprising:
a bed;
a spindle that is configured to hold a gun drill and is configured to move in a range from a moving start position to a moving end position on the bed;
a chip box that is arranged on a moving end position side of the spindle and rotatably supports the gun drill;
a workpiece holder that is arranged adjacent to the chip box on an opposite side of the chip box respective to the spindle; and
a plurality of swing stopping devices configured to hold the gun drill and suppress a swing of the gun drill arranged in a free zone between the chip box and the spindle, each of the plurality of swing stopping devices being configured to retract from a steady action position, at which a swing stopping action is performed, to avoid interference with the spindle moving in the free zone, the plurality of swing stopping devices including:
a plurality of fingers configured to hold and release the gun drill when the plurality of fingers open and close,
a slide arranged in the free zone, the plurality of fingers being arranged on a free end side of the slide, the slide being configured to move on the bed in a direction orthogonal to an arrangement direction of the gun drill, and the slide is configured to move to the steady action position in which the plurality of fingers hold the gun drill, and
a slide shift cylinder configured to drive the slide, wherein:
a front end of the gun drill held in the spindle is configured to be brought from the chip box to a workpiece held in the workpiece holder, and
the spindle rotates and extends to drill a hole in the workpiece.

2. The gun drill machine according to claim 1, wherein each of the plurality of swing stopping devices have fixed arrangement positions in a longitudinal direction of the free zone.

3. A gun drill machine comprising:
a bed;
a spindle that is configured to hold a gun drill and is configured to move in a range from a moving start position to a moving end position on the bed;
a chip box that is arranged on a moving end position side of the spindle and rotatably supports the gun drill;
a workpiece holder that is arranged adjacent to the chip box on an opposite side of the chip box respective to the spindle; and
a plurality of swing stopping devices configured to hold the gun drill and suppress a swing of the gun drill arranged in a free zone between the chip box and the spindle, each of the plurality of swing stopping devices being configured to retract from a steady action position, at which a swing stopping action is performed, to avoid interference with the spindle moving in the free zone, the plurality of swing stopping devices including:
a plurality of fingers configured to hold and release the gun drill when the plurality of fingers open and close, wherein:
each of the plurality of the swing stopping devices moves from a retraction position to the steady action position of the gun drill in a manner that the plurality of fingers are positioned horizontal to the bed,
each of the plurality of the swing stopping devices includes a derricking arm and an opening/closing link supported by the derricking arm, the derricking arm being pivotably arranged on a bed side of the derricking arm by an arm pivot at a base end of the derricking arm and pivotably supports the opening/closing link on a free end side of the derricking arm,
a first finger of the plurality of fingers is arranged on the derricking arm side and a second finger of the plurality of fingers is arranged on an opening/closing link side,
a slide shift cylinder performs a derricking operation of the entire swing stopping device and opens and closes both of the first and second fingers,
a front end of the gun drill held in the spindle is configured to be brought from the chip box to a workpiece held in the workpiece holder, and
the spindle rotates and extends to drill a hole in the workpiece.

4. The gun drill machine according to claim 3, wherein:
the opening/closing link in each of the plurality of the swing stopping devices is pivotably arranged on the derricking arm in an opening/closing link pivot, which is located at an intermediate portion of the opening/closing link,
the second finger is formed on a free end side of the opening/closing link,
a shift receiving part is formed on a rear end part side of the opening/closing link, a shift rod of a shift cylinder that pulls up the derricking arm in a standing/retracting direction is connected to the shift receiving part, the swing stopping device is configured to hold the gun drill with the plurality of fingers at an extended position of the shift rod, and when the shift rod contracts, the opening/closing link is configured to pivot around the opening/closing link pivot so as to make the second finger retract to an open jaw state, and subsequently, the entire derricking arm is pivoted and shifted in the standing/retracting direction.

5. The gun drill machine according to claim 4, wherein each of the plurality of swing stopping devices have fixed arrangement positions in a longitudinal direction of the free zone.

6. The gun drill machine according to claim 3, wherein each of the plurality of swing stopping devices have fixed arrangement positions in a longitudinal direction of the free zone.

\* \* \* \* \*